Figure 1:
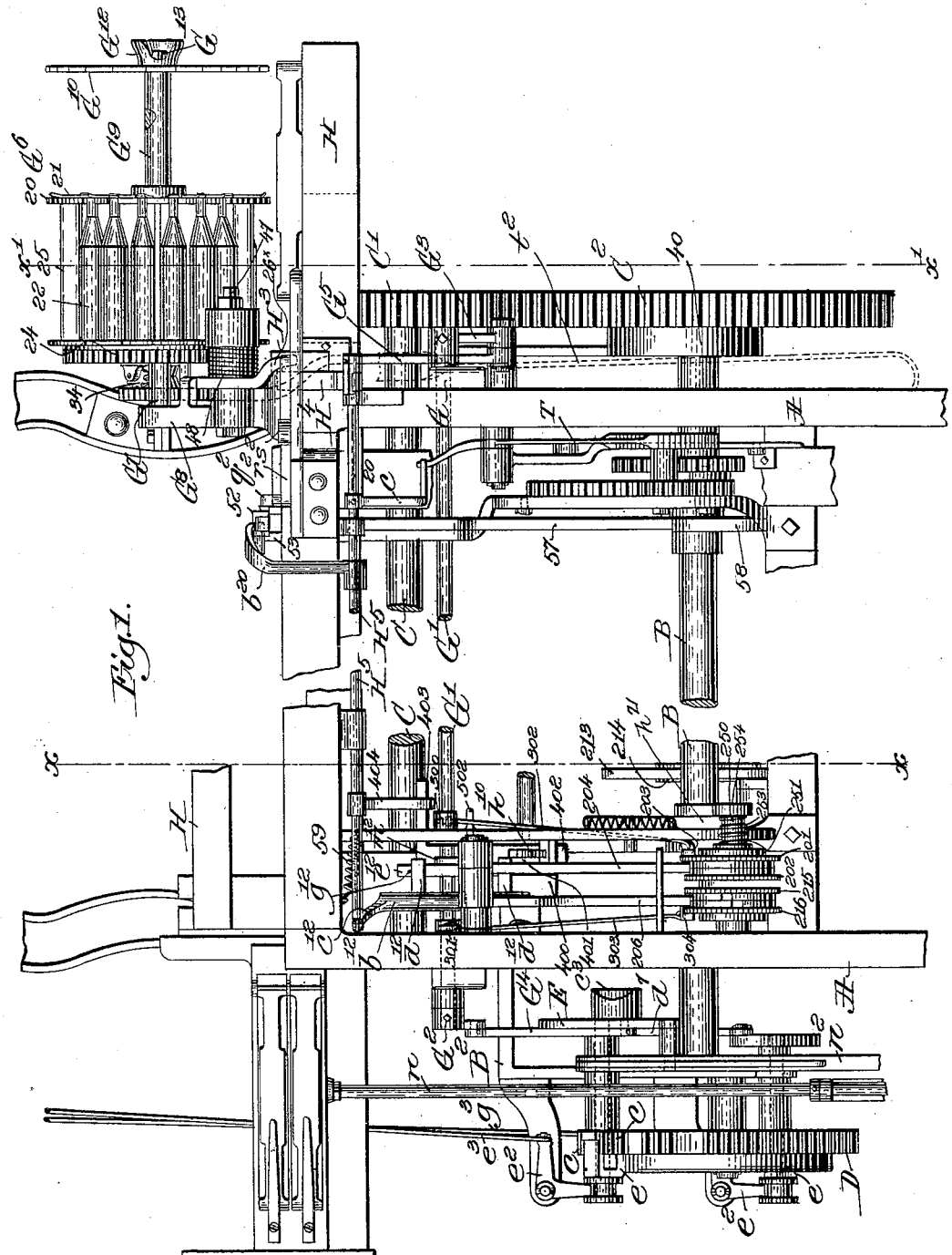

(No Model.) 8 Sheets—Sheet 1.
R. CROMPTON & H. WYMAN.
LOOM.

No. 600,121. Patented Mar. 1, 1898.

Witnesses.
Fred S. Greenleaf
O. J. Drummond

Inventors.
Randolph Crompton.
Horace Wyman.
by Crosby Gregory Attys.

(No Model.) 8 Sheets—Sheet 2.
R. CROMPTON & H. WYMAN.
LOOM.

No. 600,121. Patented Mar. 1, 1898.

Witnesses.
Fred S. Greenleaf.
Thomas F. Drummond.

Inventors.
Randolph Crompton.
Horace Wyman.
by Crosby & Gregory. Attys.

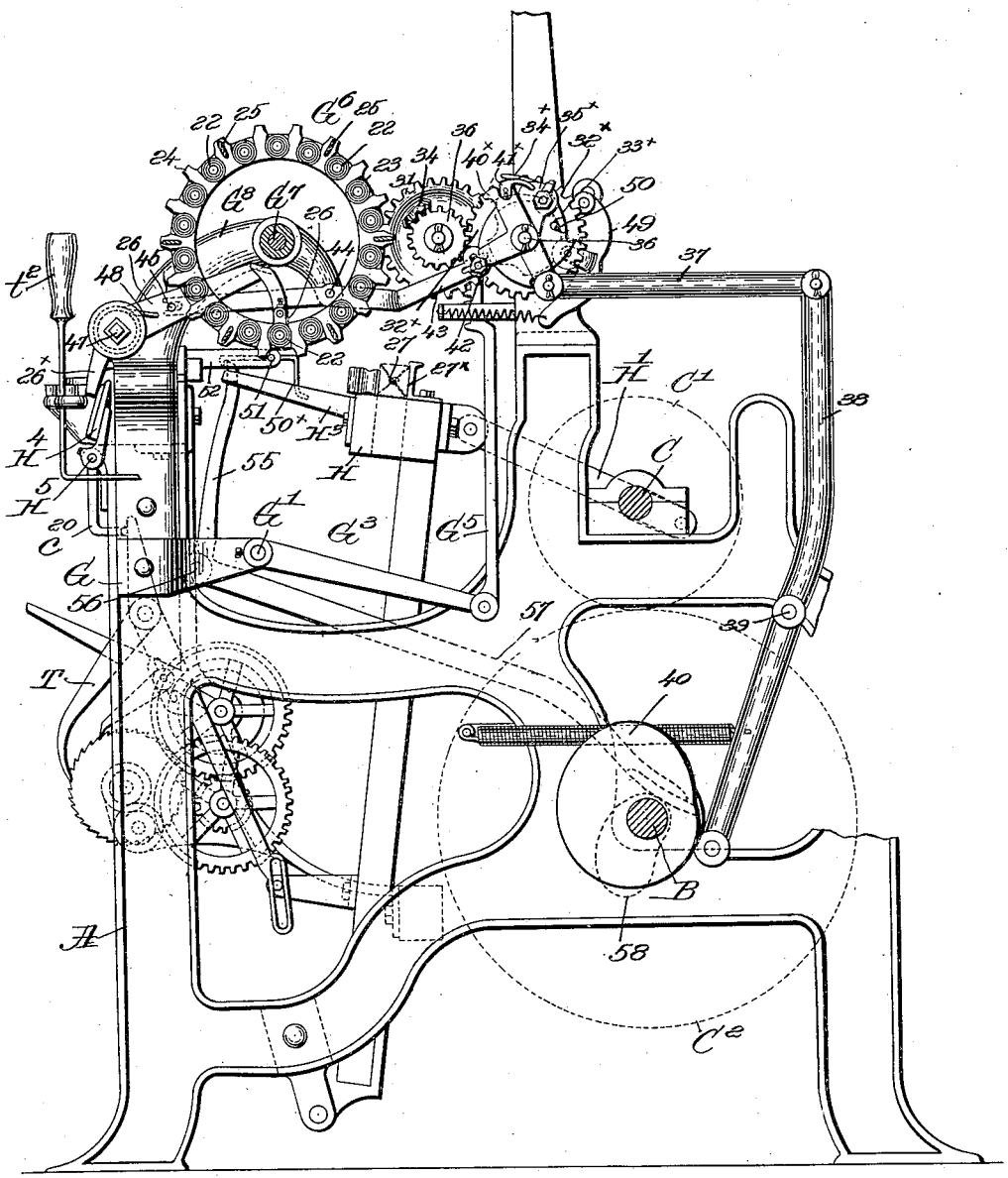

(No Model.) 8 Sheets—Sheet 5.
R. CROMPTON & H. WYMAN.
LOOM.
No. 600,121. Patented Mar. 1, 1898.
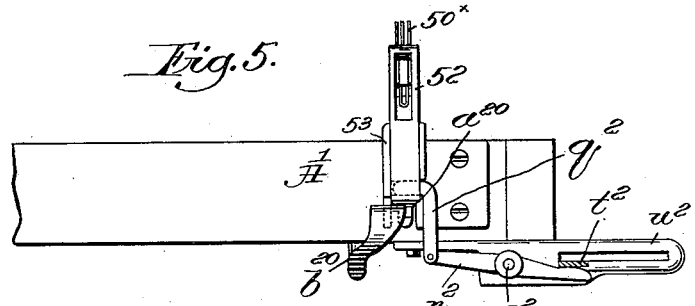

(No Model.) 8 Sheets—Sheet 6.
R. CROMPTON & H. WYMAN.
LOOM.
No. 600,121. Patented Mar. 1, 1898.
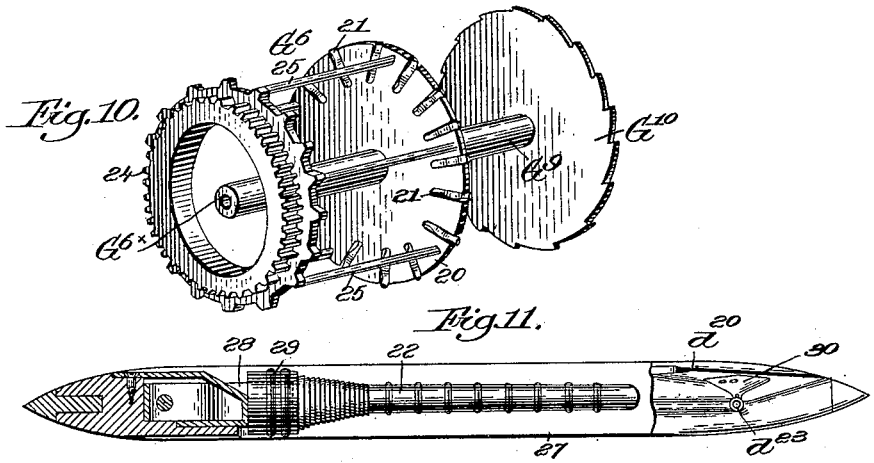
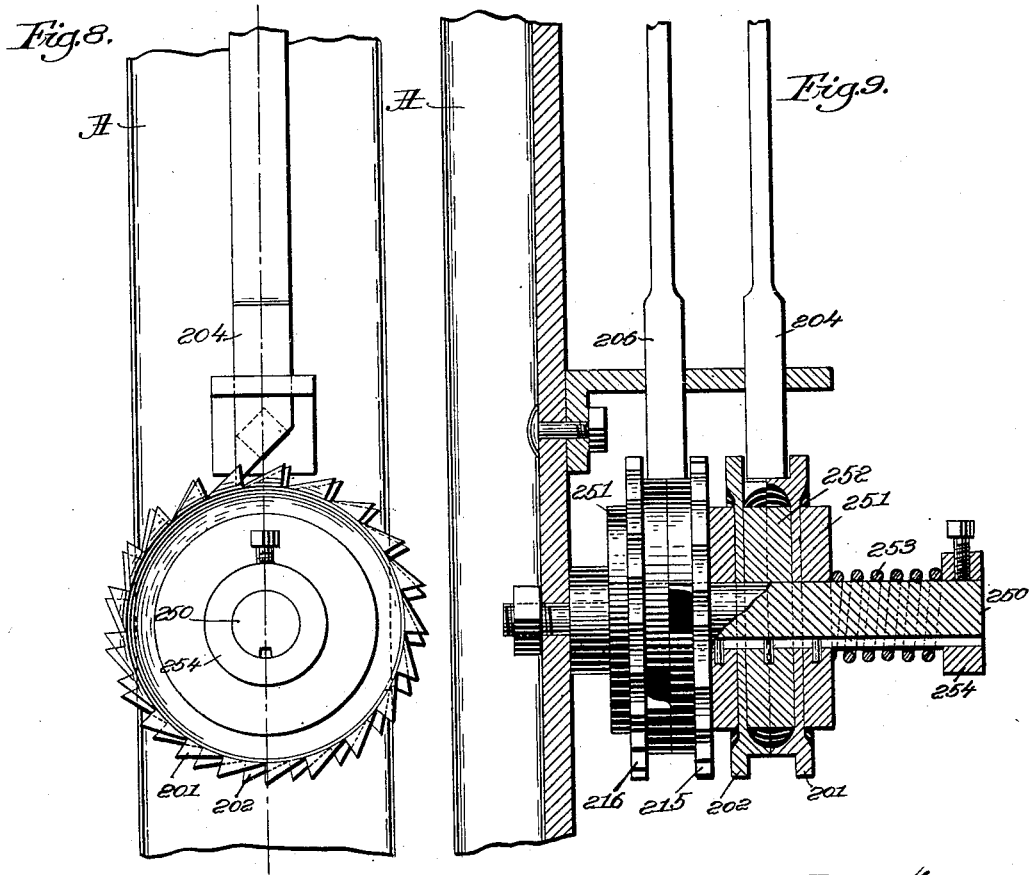
Witnesses:
Fred S. Greenleaf
Thomas J. Drummond
Inventors.
Randolph Crompton
Horace Wyman
by Crosby & Gregory Attys.

(No Model.)   R. CROMPTON & H. WYMAN.   8 Sheets—Sheet 7.
LOOM.
No. 600,121.   Patented Mar. 1, 1898.

Witnesses:
Fred S. Greenleaf
Thomas J. Drummond

Inventors.
Randolph Crompton.
Horace Wyman.
by Crosby Gregory Attys.

(No Model.)  8 Sheets—Sheet 8.
R. CROMPTON & H. WYMAN.
LOOM.
No. 600,121. Patented Mar. 1, 1898.
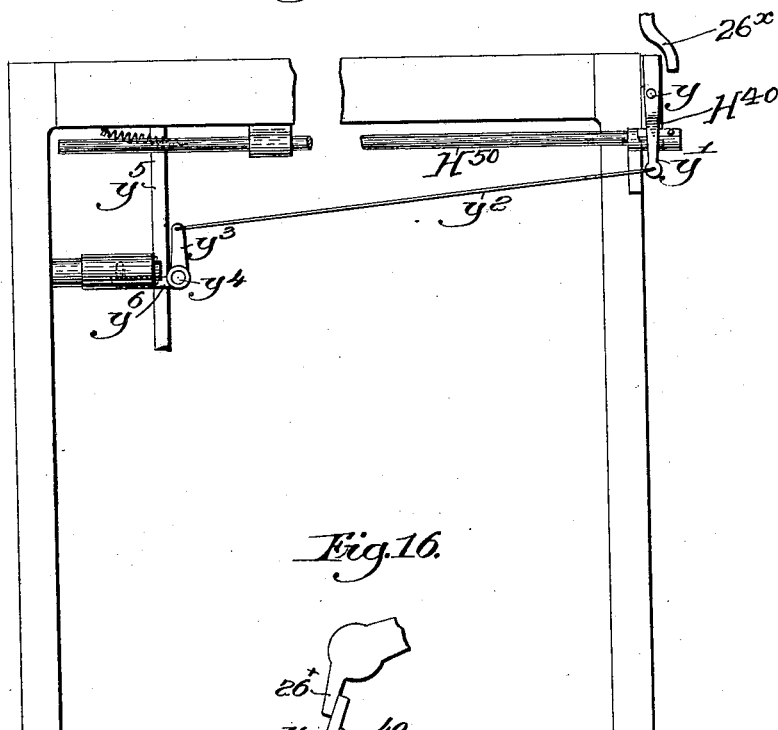
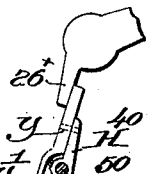
Witnesses:  Inventors.
Fred S. Greenleaf.  Randolph Crompton.
Thomas J. Drummond  Horace Wyman.
 By Crosby & Gregory, Attys.

UNITED STATES PATENT OFFICE.

RANDOLPH CROMPTON AND HORACE WYMAN, OF WORCESTER, MASSACHUSETTS, ASSIGNORS TO THE CROMPTON & KNOWLES LOOM WORKS, OF SAME PLACE AND PROVIDENCE, RHODE ISLAND.

LOOM.

SPECIFICATION forming part of Letters Patent No. 600,121, dated March 1, 1898.

Application filed March 12, 1897. Serial No. 627,209. (No model.)

*To all whom it may concern:*

Be it known that we, RANDOLPH CROMPTON and HORACE WYMAN, of Worcester, county of Worcester, State of Massachusetts, have invented an Improvement in Looms, of which the following description, in connection with the accompanying drawings, is a specification, like letters and numerals on the drawings representing like parts.

This invention has for its object to provide a loom using a plurality of shifting shuttle-boxes, each containing a shuttle having a removable filling-carrier and having a filling-carrier feeder and a transferrer to transfer a filling-carrier from the filling-feeder into a shuttle in the usual stationary boxes contained within the lathe, with a plurality of measuring means and means to actuate the same and means intermediate said measuring means and the transferrer to effect the operation of the transferrer whenever the said measuring means indicate that the filling has been substantially measured off from either of the said plurality of the filling-carriers in the plurality of shuttles contained in the shifting boxes. In this class of looms where figures are produced by an employment of plurality of colors of woof used in a certain predetermined order and for a certain number of picks it is a great desideratum to avoid leaving short ends of the filling in the shed, that the filling be ejected from the shuttle just before it has been fully exhausted, and to do this it is necessary that the filling be measured as it is taken from the filling-carrier. We have devised measuring means for this purpose—measuring means which coöperate with each shuttle used independent of the other shuttle, so that each shuttle is cared for whether it be used for a greater or less number of picks in making the pattern.

Figure 2:
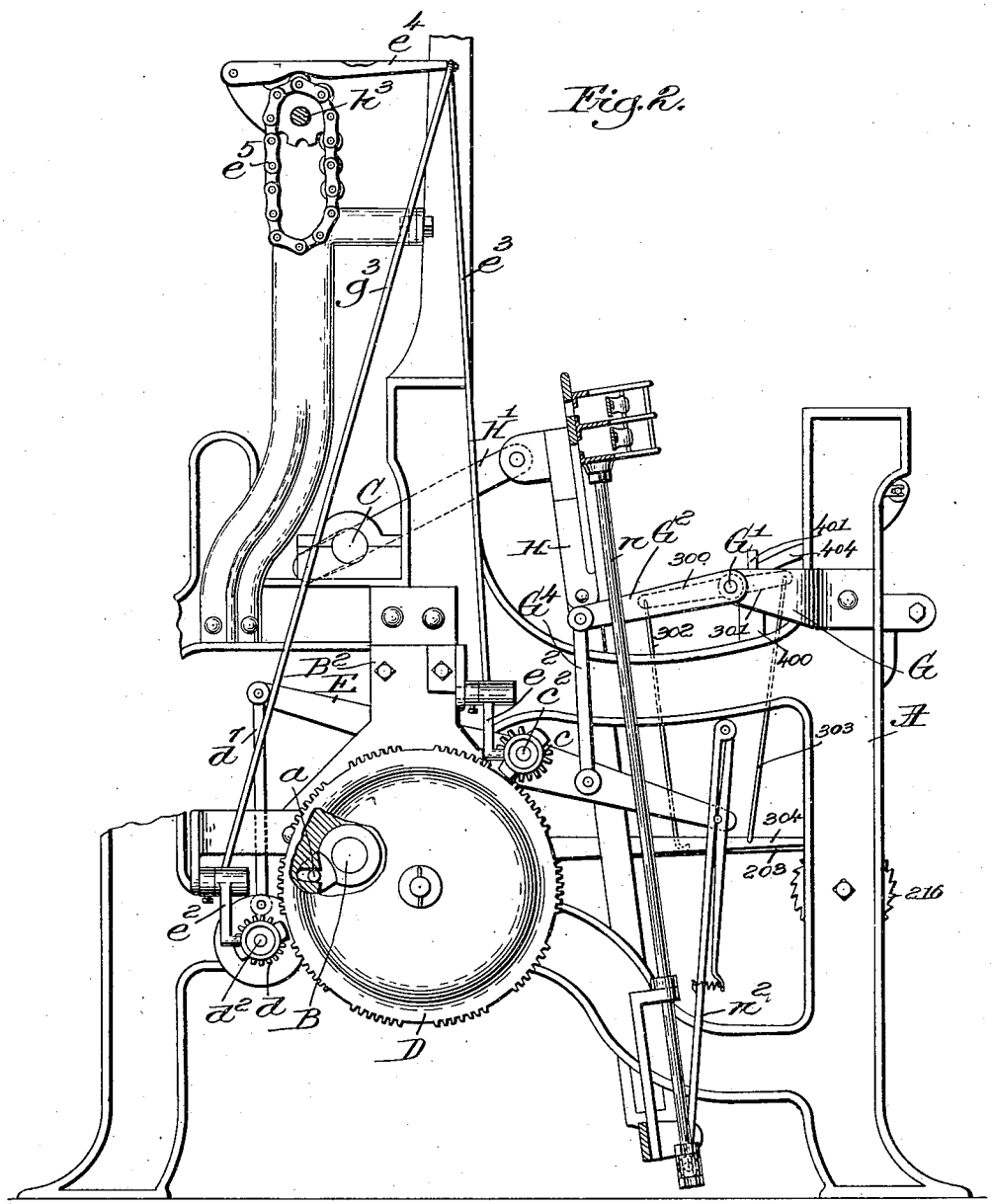
Figure 3:
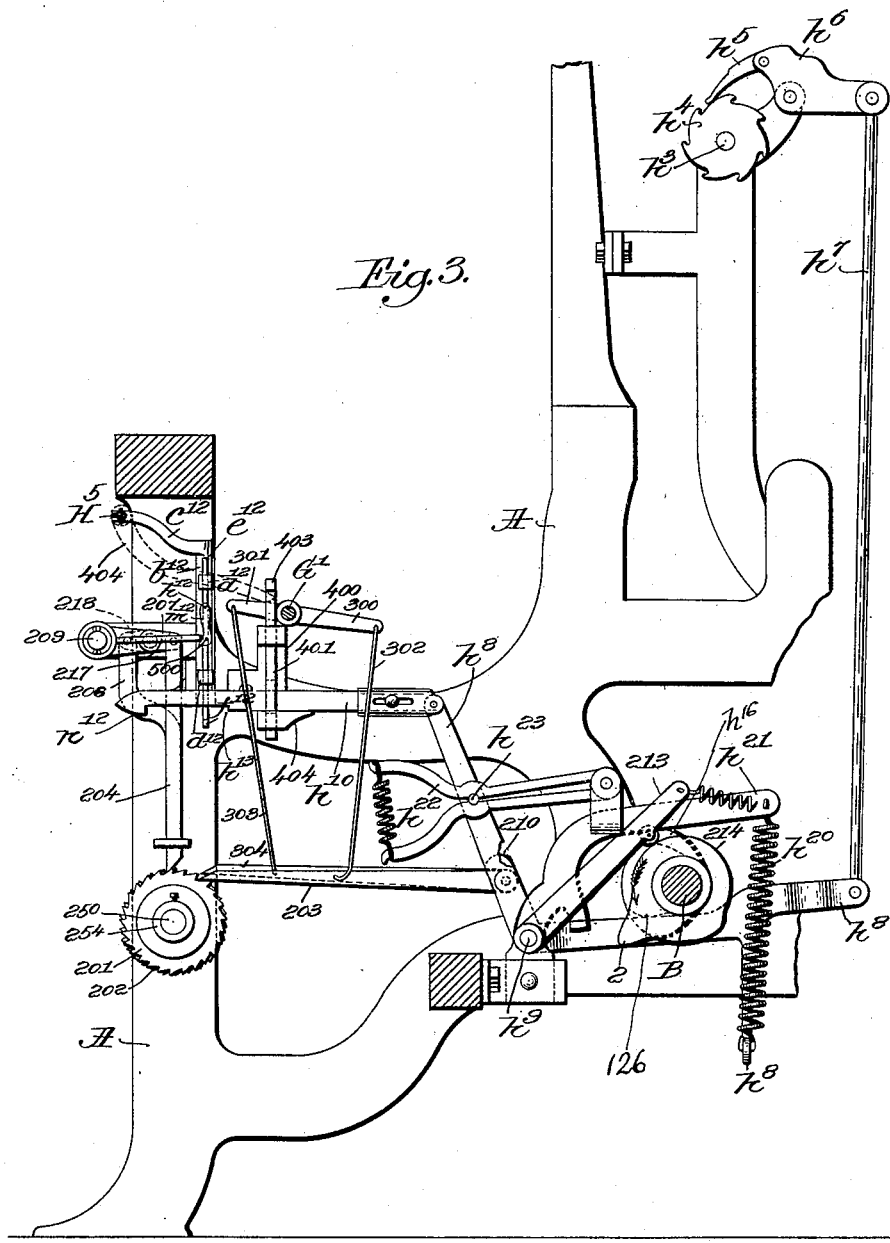
Figure 13:
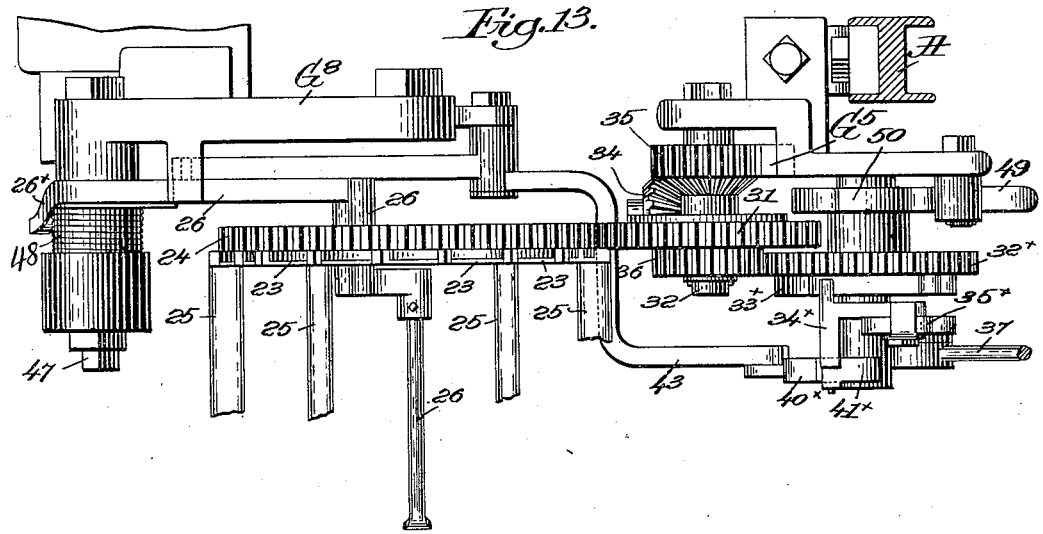
Figure 14:
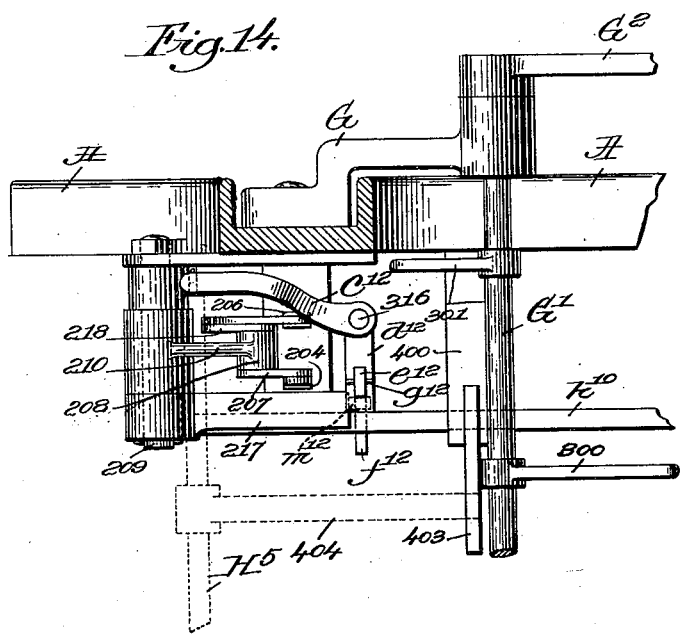

Figure 1, in front elevation, partially broken away at its top and out centrally, shows a loom containing the improvements to be herein described, said figure showing by dotted lines only a part of the shipper-handle of the belt-shifting mechanism; Fig. 2, a left-hand elevation thereof; Fig. 3, a section in the line $x$, Fig. 1, showing most of the parts within the frame of the loom to the left, the lay and its crank-shaft being omitted. Fig. 4 is a section to the left of the dotted line $x'$, Fig. 1. Fig. 5 is a plan view showing one end of the breast-beam, the filling-fork, its slide, the shipper-handle and devices to release it, and part of the stand $G^8$. Figs. 6 and 7 are details of the devices for sliding the rod employed for determining the action of the transferrer. Figs. 8 and 9 are enlarged details of one form of measuring means or mechanism. Fig. 10 shows the filling-feeder $G^6$ detached; Fig. 11, one form of shuttle which may be used. Fig. 12 is a section showing the epicycloidal gearing employed in connection with the feeder to move it. Fig. 13 is a plan view showing the geared end of the feeder, the gearing used to move it, and the transferrer. Fig. 14 is a plan view just below the dotted line $x^2$, Fig. 6. Figs. 15, 16, and 17 show a modification to be described, and Fig. 18 is another modification.

The loom-frame A; the crank-shaft C, having a gear $C'$ engaging a gear $C^2$ on the lower or cam shaft B, the latter having an arm provided with a stud $a$, engaging intermittingly slots in the master-wheel D, mounted on a stud held in a bracket $B^2$; shafts $c^2\ d^2$, having fast on them the pinions $c$ and $d$, actuated intermittingly by the teeth of the master-gear, said shafts having their bearings in said bracket, the shaft $d^2$ having a crank connected by a link $d^7$ to the shuttle-box lever E, the shaft $c^2$ having an eccentric $c^3$, on which the shuttle-box lever rests, for its fulcrum; the sliding forked hubs $e$, having teeth to be put into and out of line with the teeth of said gear, said sliding hubs deriving their motion through levers $e^2$, operatively connected by rods $e^3\ g^3$ with suitable fingers $e^4$, resting upon a pattern surface or chain $e^5$; the lay H, actuated from the crank-shaft by suitable connecting-rods H'; the shuttle-box rod $n$, having at its upper end a series of, as herein shown, shuttle-boxes presenting two cells; and the shuttle-box lever E, suitably connected, as by a rod $n^2$, having a slip-joint, to the shuttle-box rod, are and may be all substantially as represented in United States Patent No. 364,697, dated June 14, 1887, wherein the shuttle-box mechanism is fully described and illustrated, the parts of the shuttle-box not herein shown, but which will in practice be used in this improved loom, being therein fully shown and described, like letters and numerals being used. The pattern-surface surrounds a pattern-shaft $h^3$, having at its inner end a ratchet-wheel $h^4$, which is engaged by a pawl $h^5$, pivoted on a pawl-carrier $h^6$, having an attached rod $h^7$, jointed to the end of an elbow-lever $h^8$, having its pivot on a shaft $h^9$ and provided at its upper end with a catch $h^{10}$, having a shoulder $h^{13}$, which will be herein further described when defining the invention herein contained. The lever $h^8$ is normally held toward its actuating-cam $h^{16}$ by a spring $h^{20}$, connected to it and to a lever $h^{21}$, also pivoted at $h^9$ and moved by a cam 126, said lever $h^{21}$ having a slip connection $h^{22}$, which engages a pin $h^{23}$ on the lever $h^8$; but whenever the catch $h^{13}$ is permitted to engage a shoulder of a slide-bar 401, to be described, the movement of the lever $h^8$ and the pattern-surface for the shuttle-box mechanism is stopped and the cam $h^{16}$ continues to rotate, the lever $h^{21}$ then moving and the slip device $h^{22}$ then slipping on the pin $h^{23}$, thus preventing the breaking of the parts and allowing the pattern-surface to stand still. These devices for moving the pattern-surface are substantially found in United States Patent No. 364,696, dated June 14, 1887.

The stopping of the pattern-surface is effected preparatory to operating the transferrer 26, to be described, so that the pattern-surface will remain in proper relation to the other working parts.

The frame of the loom is provided with suitable brackets G, which receive a rock-shaft G′, having two arms $G^2$ $G^3$, the arm $G^2$ being connected by a link $G^4$ with the shuttle-box lever E. The arm $G^3$ of the rock-shaft has connected to it a rack-bar $G^5$, the said link, rock-shaft, arms, and rack constituting means for actuating the system of gearing for moving the filling-carrier feeder $G^6$ backward and forward in unison with the rising and falling movements of the shuttle-box.

The filling-feeder $G^6$, as herein represented, (see Fig. 10, where the same is shown detached,) consists of a substantially circular cage composed of a hollow hub $G^{6\times}$, provided at one end with a circular head 20, having extended horizontally from it parallel to said hub a series of arms or fins 25, said arms or fins at their ends farthest from said head being connected to and supporting a toothed ring 24. The hollow hub $G^{6\times}$ of the filling-feeder is supported on a stud $G^7$, extended horizontally from one side of a stand $G^8$, fixed on the breast-beam A′ of the loom-frame, the said hub being prolonged outside the head 20 by a second sleeve $G^9$, connected to the outer side of said head, and to the said sleeve $G^9$ is connected a filling end support $G^{10}$ and a filling end holder $G^{12}$, the filling-feeder being kept on the said stud by a suitable bolt $G^{13}$.

(See Fig. 1.) The head 20 of the filling-feeder has a series of radial notches, in which are located suitable springs 21, one for each notch, and against which springs the tip of a filling-carrier 22 will be placed, while the large or base end of each filling-carrier will be inserted in a pocket 23 of the toothed ring 24.

The series of horizontal arms or fins 25, as herein shown, divide the feeder into compartments.

The internal diameter of the toothed ring 24 is such that the acting end of the transferrer 26, to be hereinafter described, may enter and be moved freely therein, said transferrer when made to descend striking the filling-carrier 22 then under it and ejecting said filling-carrier from the feeder into the shuttle 27 then in the shuttle-box below the feeder, this action taking place whenever the yarn has been nearly exhausted from the filling-carrier then in the shuttle, but only after such shuttle has arrived in the shuttle-box $27^\times$, which is located under the said feeder, said shuttle-box being fixed to that end of the lay farthest from the shifting shuttle-boxes.

The shuttle 27, Fig. 11, is of that variety wherein there is a passage through it from one side to the other side in order that the filling-carrier put into it at one side may be ejected from it at the opposite side, the said shuttle having suitable filling-carrier holders 28 of such shape as to receive rings or projections 29 of the filling-carriers 22, the shuttle also having a self or automatic threading contrivance comprehending a slot $d^{20}$ and a horn 30, (see Fig. 11,) which may be of any of the usual forms of construction, so that when a filling-carrier in the filling-carrier feeder (said filling-carrier having the end of its thread connected with the holder $G^{12}$) is put by the transferrer into the shuttle—that movement ejecting the filling-carrier then in the shuttle through the shuttle and out from the bottom of the lay—the thread of said filling-carrier as the shuttle is thrown through the shed will be automatically threaded into the slot $d^{20}$ and delivery-eye $d^{23}$ of the self-threading contrivance of the shuttle, so that the shuttle will correctly deliver the filling from it into the shed.

The filling-feeder herein described and the transferrer and the shuttle having the self-threading contrivance are in operation substantially the same as described in certain United States Patents, granted to James H. Northrop, No. 529,940, and G. O. Draper, No. 538,507; but in order to enable a shifting-shuttle-box loom to have its shuttles carrying filling of different character or colors to be automatically supplied with filling-carriers having yarn of the proper character or color the said filling-feeder has imparted to it two different sets of movements, one aiming to keep in working position or above the shuttle in operation a filling-carrier of the same color, the other movement coming into play only after the removal of a filling-carrier from the feeder into the shuttle, the movement being to skip to the next group of filling-carriers and put in operative position with relation to the shuttle another group of filling-carriers supplied with all the colors of filling being used, putting a filling of the desired character or color just removed from one group into operative position with relation to the shuttle then in use.

The filling-carriers are arranged in the filling-feeder in groups, and inasmuch as in this invention the shifting shuttle-box is provided with two cells the groups of filling-carriers are made of two each, each group of filling-carriers being provided with filling of different colors—as, for instance, red and white—and these groups are repeated, as herein shown, nine times, and the shuttles in the cells of the shifting shuttle-boxes have on starting of the loom filling-carriers having filling of the colors red and white.

The teeth of the toothed ring 24 of the filling-feeder are engaged by the teeth of a gear 31, mounted loosely on a stud 32 in a stand $31^\times$, the said gear having, however, peculiar movements, as we will now describe. The gear 31 has connected to it a stud 33, on which is loosely mounted a bevel-pinion 34, the said bevel-pinion being engaged by the bevel-teeth of a gear 35, loose on the stud 32 and engaged by the teeth of the rack $G^5$, before described, said bevel-pinion 34 also engaging the bevel-teeth of and moving a gear 36, also loose on said stud 32, the bevel-pinion 34 connecting the said two gears 35 and 36. The teeth of the loose gear 36 are in mesh with a gear $32^\times$, mounted on the stud $36^a$, having an attached ratchet-wheel $33^\times$, which may be moved intermittingly in one direction only by a pawl $34^\times$. The gear 31 may therefore be moved from two sources—that is, it may be oscillated by the rack $G^5$, gear 35, and bevel-pinion 34, the gear 36 being then held fast, or it may be rotated from the gear $32^\times$, as will be described, the rack and gear 35 being then held fast by the wheel $32^\times$. The pawl $34^\times$ is attached to a pawl-carrier $35^\times$, mounted on the stud $36^a$, the pawl-carrier having connected to its lower end a rod 37, attached to a lever 38, having its fulcrum at 39 and acted upon by a cam 40 on the lower cam-shaft B, the said pawl thus having a constant motion; but the pawl cannot engage the ratchet-wheel except when a filling-carrier is to be ejected from a shuttle and a new one put into the shuttle.

Let it be supposed that a shuttle-box having a red filling is in position at the level of the race of the lay and is working, and in such position the red filling in a group of filling-carriers is stopped immediately below the end of the transferrer, and so long as that red filling goes in and the shuttle-boxes are not shifted the red-filling carrier stands in that position and the rack $G^5$ stands still; but if the next shuttle from the red-filling shuttle—viz., the one containing white—should be brought into position by shifting the shuttle-box lever in usual manner, then that movement of the shuttle-box lever through the operative mechanism connecting it with the rack $G^5$ moves the said rack and effects the turning of the filling-feeder far enough to bring the white carrier in position below the transferrer. It will consequently be understood that the filing-feeder has an oscillating motion in extent dependent upon the motion of the shifting shuttle-boxes, and whatever the movement of the shuttle-boxes the filling-feeder has a corresponding movement, so as to always preserve the proper relative arrangement of colors, and when a measured quantity of the yarn on a filling-carrier then in use has been measured off, as will be hereinafter described, the transferrer will be operated, as will be described, and it will descend and take from the filling-feeder a filling-carrier having a filling of a color corresponding with that in the shuttle in which new filling is to be placed and then thereafter comes in the new or second movement of the filling-fieeder. One filling-carrier having been exhausted from a group of filling-carriers, another group of filling-carriers must be instantly brought into position wherein all the colors are represented in order that should the same color be next required to be taken from the filling-carrier feeder there would be opposite the transferrer a filling-carrier having filling of the proper color. The second motion referred to herein described is one of progressive rotation, and to effect this for the proper distance the pawl $34^\times$ is let come into play in the following manner, viz: The outer end of the pawl $34^\times$, (see Figs. 4 and 13,) attached to the elbow-lever $35^\times$, pivoted on the stud $36^a$, lies normally on and is reciprocated backward and forward over a pawl-lifter $41^\times$ and a pawl-rest $40^\times$, but normally the pawl is not moved off from the said rest and it cannot consequently engage the teeth of the ratchet $33^\times$ to turn it. The pawl-lifter $41^\times$ is pivotally mounted upon the pawl-rest $40^\times$, shown as a second elbow-lever mounted upon the stud $36^a$ outside the lever $35^\times$, one arm of said pawl-rest being shown as provided with an adjustable stud 42, which is embraced by the slotted end of a pawl-rest controller 43, shown as a lever having its fulcrum on a stud 44, projected from the stand $G^8$, the opposite end of said controller being also shown as forked (see Fig. 4) and as embracing a pin 45, carried by the transferrer 26.

The transferrer-carrying arm $26^a$ is mounted upon a stud 47, secured to the fixed stand $G^8$, and said arm is offset near its free end to thus enable it to pass through the gear 24 and support its acting end or portion which acts on the filling-carriers above the said carriers. The stud 47 has wound upon it a suitable strong spiral spring 48, the free end of which engages the transferrer-carrying arm, while the opposite end of said spring is fixed with relation to the stud, the said spring normally keeping the transferrer elevated, so that the filling-carriers held in the feeder in the movement of the latter may readily pass under the acting end of the transferrer. The transferrer has a short arm $26^\times$ (see Fig. 4) and the lay-beam has an attached bunter $H^3$, and whenever a finger $H^4$, attached to a sliding and rocking rod $H^5$, to be herein further described, having suitable bearings under the breast-beam, is moved, in this instance of our invention to the right, Fig. 1, far enough to put said finger in the path of the short arm $26^\times$ of the transferrer and the bunter the lay as it comes forward causes the bunter to act on the finger and give the latter a quick movement, causing the finger to act on the arm $26^\times$ and move the transferrer-carrying arm, so that it will act on and take the filling-carrier then under it from the filling-feeder and put it into the shuttle then in the stationary box, the incoming filling-carrier meeting and ejecting from the shuttle the filling-carrier therein from which the yarn has been nearly all measured off. In order that the gear $32^\times$ may not be moved farther than required, a suitable spring-pressed locking-lever 49 (see Fig. 4) has been provided, it having a roll (shown in that figure by dotted lines) which enters notches in a notched wheel 50, also shown by dotted lines. While the transferrer is descending to act upon and remove a filling-carrier from the filling-feeder, the lever 43 is moved sufficiently to turn the pawl-rest $40^\times$ a little to the right, so that as the pawl $34^\times$ is again moved forward it slips over the end of the said rest, drops into engagement with a tooth of the ratchet-wheel $33^\times$, and gives it a quick movement, the said movement taking place, however, after the transferrer has effected its work, the movement being sufficient to move the filling-feeder for a distance equal to the space occupied by one group of filling, so that a filling-carrier of the same color may be brought into operative position under the transferrer after a filling-carrier has been ejected from the feeder, or, in other words, the filling-carrier which is brought by the movement of the feeder, due to the ratchet referred to, in position opposite the transferrer will always be of the same color as that on the filling-carrier which was just removed from the feeder by the transferrer.

In practice the gears 36 and $32^\times$ will be in such proportion as to size and the ratchet-teeth of the gear $32^\times$ will be in such number as to give to the filling-feeder the desired extent of movement, that depending upon the number of colors used in the filling-feeder and the number of shuttle-boxes employed at the opposite end of the loom. This proportion may be varied at will according to the number of colors and the work to be done. The pawl $34^\times$ having reached the end of its back stroke, it having moved the ratchet, again starts forward in the regular movement of the pawl, and the finger projecting from the pawl strikes the free end of the pivoted pawl-lifter $41^\times$, said end being downturned, so that it catches under and lifts the pawl from engagement with the ratchet and enables it to slide back and forth on the pawl-rest $40^\times$ until the transferrer is again operated.

In this invention the movement of the transferrer is dependent upon, as herein shown, the removal of a measured quantity of filling from a filling-carrier.

The filling-fork $50^\times$, herein used to stop the loom when the filling breaks, is pivoted at 51 on a slide 52, which is adapted to be reciprocated in a stand 53, fixed to the breast-beam $A'$, the filling-fork having at its inner end the usual heel, (shown by dotted lines, Fig. 4,) which drops whenever the filling is absent from in front of the filling-fork as the lay beats forward, so that said heel is caught by the upper end of the filling-hammer 55. This hammer is shown as a lever pivoted at 56 and having an arm 57, which is acted upon by a suitable cam 58 on the shaft B, all in usual manner.

Any other usual form of self-threading shuttle, of which there are many examples, may be employed.

We have mentioned that the fillings are of different colors; but they may be of different material or character, each one working in its own proper shuttle in a defined order.

The system of gearing herein shown to impart the described movements to the feeder is one form of epicycloidal gearing, and instead any other usual or equivalent means may be employed to actuate the feeder.

The open ring-like inner end of the filling-feeder, having the teeth to be engaged by the pinion 31, is supported by arms or fins 25; but all the said fins are not needed, and it is not essential to separate the filling-carriers at any particular spot.

The lever E, controlled by the pattern-chains $c^5$, determines by its movement not only the position of a shuttle having filling of a particular color, but it also determines independently by or through the shaft $G'$ the particular color of the filling on the filling-carriers to stand under the pusher.

The parts so far described are contained in another application for United States patent, said application having the Serial No. 597,975, filed July 3, 1896, and are not therefore herein broadly claimed.

In order that a filling-carrier in a shuttle being used may be withdrawn from operation after a stated length of filling has been taken from the filling-carrier, measuring means have been devised for measuring the filling as used, which means will now be described. This measuring means, as it has been chosen to herein illustrate it, consists, essentially, of two ratchet-wheels 201 and 202, (see Figs. 8 and 9,) the one 201 having twenty-one teeth and the one 202 alongside of it having twenty teeth, the said ratchet-wheels being mounted on a stud 250 and both actuated by the same pawl 203, attached to an arm 210 (see dotted lines Fig. 3) of the rock-shaft $h^9$, constituting the pivot for the levers $h^8$ and $h^{21}$, said rock-shaft having a second arm 213, which is acted upon by a cam 214 on the shaft B. The bodies of these ratchet-wheels run between suitable friction-blocks 251 252, which are restrained from rotation on said stud through the action of a suitable spring 253, the stress of which may be regulated as desired by adjusting the collar 254. These ratchet-wheels at their contiguous sides have each a flange, and each flange has an opening of substantially one-half the area of the end of a leg 204, resting with its lower end on both flanges. The openings in these flanges when the loom is started do not register, and the leg is consequently supported by the flanges, and it cannot enter the opening until both register or come exactly opposite each other under the leg. These openings will not register until after the said wheels have been moved a number of times—equal to twenty multiplied by twenty-one, or for four hundred and twenty—and as these wheels are moved only at every other pick the openings will not register until after eight hundred and forty picks of filling have been put into the shed, which number, it will be supposed, will exhaust most of the filling from the filling-carrier used in the shuttle. The number of teeth on these wheels may be varied, so that the product derived from multiplying together the number of their teeth may designate a greater or less number of picks and consequently length of filling put into the shed by the flight of the shuttle through it, and in this way provision may be made for stopping the use of a filling-carrier having a longer or shorter length of filling. Two sets of these ratchet-wheels are shown, for the reason that in this invention two shuttles are employed, and each shuttle has consequently its own measuring means, and both these measuring means being alike it is unnecessary to particularly describe but one of them herein. The second leg is marked 206 and its pair of ratchet-wheels 215 and 216, they being actuated by a pawl 304, also attached to the arm 213. The leg 204 is jointed to an arm 207 of a rock-shaft free to turn in a bearing 208 at the end of an arm 210, mounted to turn on a pin 209, said arm having fixed to or movable with it a finger 217. The rock-shaft carrying the arm 207 has an oppositely-extended arm 218, to which is connected the bent upper end of the leg 206, so that the descent of either of said legs into the registered openings of either of the flanges on which the legs normally rest will cause the finger 217 to descend.

The loom-frame has suitably connected with it, as shown in Fig. 7, at its inner side a stand $a^{12}$, having an upright pin 316, (shown by dotted lines,) on which is mounted a rocking hub or shaft $b^{12}$, provided with two like guide-lips $d^{12}$, said lips receiving and guiding a drop device $e^{12}$, having at its lower end a lug $f^{12}$, a pin $g^{12}$, extending through the drop device, limiting its descent. This drop device has pivoted on it at one side, as at $h^{12}$, a gravitating latch $m^{12}$. The loom side sustains (see Fig. 3) a stand 400, in which is mounted the slide-bar 401, having a slot through which is passed the catch $h^{10}$, and at its upper end said slide-bar has a projection 403, to be hereinafter described. When the loom is running regularly, the under side of the catch $h^{10}$, back of the shoulder $h^{13}$, rests on the foot 404 of the stand 400, and the hook $n^{12}$ of the catch $h^{10}$ occupies a position in and slides in a plane above the lug $f^{12}$.

The rock-shaft G' in this instance of this invention is shown as utilized to govern the pawls 203 and 304 for actuating the measuring means, said rock-shaft having oppositely-extended arms 300 and 301, which are connected, respectively, with said pawls by rods 302 303, and inasmuch as the said rock-shaft is moved in unison with the shuttle-box lever employed to raise and lower the shuttle-boxes to put one or the other color in place, said lever also effecting the movement to and fro of the feeder, provided with the extra filling carriers, it follows that only one of said pawls will act at every other beat of the lay, and the particular pawl to operate will depend upon the particular shuttle being used. In this way each measuring means will be actuated only while the particular shuttle under its control is being used. The pawl 203 is operated to turn the ratchets 201 and 202 when the lowest shuttle-box of the series is opposite the raceway of the lay, the other pawl 304 being operated when the shuttle-box next above the lowest one of the series is in position opposite the raceway of the lay.

We will herein state that the shuttle-box mechanism shown is capable of caring for a set of three shuttles; but to use it for two shuttles, as we have herein described, we have only to so modify the make-up of the pattern surface or chain that one or the other of the shafts $c^2$ or $d^2$ employed to move the shuttle-box lever will not be actuated.

Whenever in the operation of the loom a measured or indicated quantity of filling has been run off or laid into the shed from a particular shuttle, the measuring means coöperating with that shuttle then in operation presents in line the openings hereinbefore referred to made in its two flanges, and a leg before sustained by said flanges enters the opening, which results in turning the hub of the arm 210 on the stud 209 and lowers the finger 217, it in its descent acting on the beveled edge of the latch $m^{12}$ and pushing it back, so that the finger passes below the lower end of the catch. This finger will be lowered whichever leg drops and enters an opening, and whichever leg enters the opening it is lifted therefrom instantly, as herein shown, at the same pick in which it entered, this being due to the shape of the lower end of the leg and of the opening, and the quick raising of the leg elevates the finger 217, causing it to strike the lower end of the latch $m^{12}$ and lift with it the drop device $e^{12}$, putting the lug $f^{12}$, connected to its lower end, in the range of movement of the hook $n^{12}$ of the catch $h^{10}$, said catch turning the rock-shaft $b^{12}$ and causing the slide-rod $H^5$, which is embraced by the forked arm $c^{12}$ at the upper end of said rock-shaft, to be slid longitudinally, said movement putting the finger $H^4$, attached thereto, between the short arm of the transferrer 26 and the bunter, so that said bunter meeting the said finger $H^4$ turns the transferrer, as before described. The partial rotation of the rock-shaft $b^{12}$ carries the latch $m^{12}$ laterally off from the upper side of the finger 217, which lifted the drop-wire, so that the drop device may descend and put its lug $f^{12}$ out of the range of movement of the catch $h^{10}$. The transferrer having been operated, a suitable spring 59 acts immediately to return the slide-rod into its normal position and return the rock-shaft $b^{12}$ into its normal position. As the rock-shaft $b^{12}$ is returned into its normal position a pin 500 on the latch $m^{12}$ meets the convexed side of a finger 501, pivoted at 502, said pin by acting against said finger being checked in proper position, so that as the finger descends it will be free from the latch. This latch rises when the drop device is lifted.

Herein, when the filling breaks the loom is stopped through the action of the filling-fork, and the take-up and pattern-surface are also stopped. When the filling is absent from the front of the filling-fork $50^\times$, the down-turned heel at the opposite end of the fork is caught by the filling-hammer 55, and the filling-fork slide, on which the filling-fork is pivoted, is moved outwardly across the breast-beam. This slide near its outer end has jointed to it a finger $q^2$, which is pivotally connected with a knock-off lever $r^2$, pivoted at $s^2$ on a stand secured to the loom, said stand having a notched plate $u^2$ to hold the shipper-handle $t^2$, the movement of the filling-fork slide, as described, causing the knock-off to push the shipper-handle out of its notch, it in its movement coöperating with usual belt-shipper mechanism, (not shown;) but said shipper mechanism may be of any of the forms commonly found in Crompton and other looms, as in United States Patent No. 95,092, dated September 21, 1869, and we shall hereinafter designate as the "stopping mechanism" the shipper-handle and the usual parts to be actuated by it. The upper side of the filling-fork slide has at its end a deep groove $a^{20}$, in which rests at all times the broadened or widened upper end of an arm $b^{20}$, fixed to the slide-rod $H^5$, no matter what is the position of the said slide-rod, or, in other words, notwithstanding the sliding motion of said rod the said broadened end of the arm $b^{20}$ always remains in the notch $a^{20}$. Consequently when the filling-fork slide is pushed outwardly, as described, it, acting on the arm $b^{20}$, turns the slide-rod $H^5$, causing it to turn an attached arm 404, the said arm meeting the projection 403 at the upper end of the slide 401, thus lifting said slide, so that when the catch $h^{10}$ comes again forward the shoulder $h^{13}$ will meet a portion of said slide, which will stop the movement of the catch $h^{10}$ and the lever $h^8$, and consequently will stop further movement of the pattern surface or chain, the spring $h^{20}$ at such time giving way and letting the lever $h^{21}$ move and the slip-joint $h^{23}$ break away from the pin $h^{22}$. So, also, during the rocking movement of this slide-rod $H^5$, the finger $H^4$ at such time not being in line with the short arm of the transferrer, a finger $c^{20}$ (see Fig. 4) acts against the upper end of a holding-pawl T employed to engage the ratchet-wheel of the take-up, thus temporarily suspending the operation of the take-up.

The particular construction of the ratchet or other wheels employed in the measuring means and the devices for actuating the measuring means may be variously modified, and instead we may employ as equivalents any usual speed-decreasing mechanism wherein a fast-moving device or wheel actuates another device or wheel at a slower speed, so that the slow-moving device after it has passed over a defined space will cause said slow-moving device to operate suitable mechanism to effect the operation of the filling-changing mechanism.

Referring to Fig. 8, showing a detail of the measuring means, it will be seen that the lower ends of the legs 204 and 206 are beveled to a rather fine point, and as soon as both openings in the two flanges, with which each leg coöperates, present their edges in alinement the leg will drop, effecting the operation of the transferrer, and, without stopping the movement of the measuring means, the said leg is instantly raised before the lay again comes forward, and so it is impossible to operate the transferrer twice in immediate succession to make two successive changes of bobbin-carrier in the same shuttle.

In our invention we actuate the plurality of measuring means by a plurality of pawls which are practically controlled by a pattern-surface, and said pawls are put into and out of position in accordance with the change from one to another shuttle in the series of shifting shuttle-boxes, and these pawls are connected with the shaft G', moved by the movement of the shuttle-box-shifting lever, in turn controlled as to the time of its movement by the pattern-surface.

The transferrer and its actuating parts constitute what is herein designated as "filling-changing mechanism," and instead of the particular transferrer and the means shown for actuating it any other suitable or well-known filling-changing mechanism may be employed, and so, also, instead of the particular filling-feeder any other suitable or well-known device may be employed.

This invention is not limited to the exact measuring means shown nor to the intermediate connections shown between the measuring means and the transferrer, for it will be obvious to those skilled in the art that these devices might be variously changed or modified by the exercise only of mechanical skill and not requiring invention.

This invention is not limited to the particular mechanism shown intermediate the measuring means and the transferrer, and instead of the devices thus far specifically described we may employ mechanism such as shown in Figs. 15 and 16. In these figures the rod $H^{50}$, which takes the place of the rod $H^5$, is merely a rocking rod, and it has a short arm $H^{40}$, on which is pivoted on a horizontally-arranged stud $y$ a finger $y'$, connected at its lower end with a rod $y^2$, in turn connected with one arm of an elbow-lever $y^3 \, y^6$, pivoted at $y^4$ in a stand $y^5$, depending from the breast-beam, the arm $y^6$ of said lever being extended under the arm 210, which is fully shown in Fig. 6, and when either of the legs connected with said arm enters the registered openings in the measuring means the said lever $y^4 \, y^6$ will be moved to turn the finger $y'$ and put it between the short arm $26^{\times}$ of the transferrer and the bunter before described connected with the lay, the finger when so turned causing the transferrer to be worked.

As an equivalent for the measuring means we may also use devices such as employed in United States Patents No. 281,195, dated July 10, 1883, and No. 286,206, dated October 9, 1883, letting the drums shown in said patents, which receive the chain or rope to which the weight to be lifted is attached, carry a pattern-chain, as $y^{10}$, to act on and lift the lever $y^3 \, y^6$, the faster-moving parts in said patents deriving their movement from pawls or other devices actuated by or with the lay. In Fig. 18, showing this third modification, the lever $y^3 \, y^6$ is reversed from the position shown in Fig. 15.

Having described our invention, what we claim, and desire to secure by Letters Patent, is—

1. In a loom, the following instrumentalities, viz: a lay; a plurality of shuttle-boxes moving therewith; means to put said shuttle-boxes alternately at the level of the race of the lay for one or more picks according to the requirements of the shuttle-box pattern-surface in order that the shuttles contained in said boxes may be thrown through the shed a greater or less number of times and be again returned into its own box; and a plurality of measuring means, one for each shuttle-box, and means to actuate each of said measuring means only when the shuttle in the shuttle-box under its control is operative, whereby when the filling has been exhausted from one of said shuttle-boxes, the particular measuring means coöperating with that particular shuttle-box will be actuated to automatically discontinue the further use of that particular filling-carrier, substantially as described.

2. A loom containing the following instrumentalities, viz: a series of shuttle-boxes each containing a shuttle having a removable filling-carrier, automatic filling-changing mechanism, and a plurality of measuring means one for each shuttle constructed and adapted after a predetermined quantity of filling has been taken from either filling-carrier, that depending on the number of its passages through the shed, to automatically set in motion said filling-changing mechanism and put a new filling-carrier in and remove from the shuttle the filling-carrier from which the filling has been measured off, substantially as described.

3. In a loom the following instrumentalities, viz: a shuttle, actuating means therefor, a filling-feeder to contain a supply of filling-carriers for said shuttle, filling - changing mechanism, measuring means to actuate said filling-changing mechanism after a predetermined length of filling has been taken from a filling-carrier by its passage through the shed, to remove the nearly-exhausted filling-carrier from the shuttle and put a fresh filling-carrier in its place; and a filling-fork, its slide, stop-motion mechanism, and devices intermediate the filling-fork slide and stop-motion mechanism to stop the loom in case the filling breaks, substantially as described.

4. In a loom the following instrumentalities, viz: a filling-feeder, a transferrer, a lay, a bunter, a slide-rod having a finger adapted to be interposed between said bunter and an arm forming part of said transferrer, and measuring means actuated during the operation of the loom, said measuring means after a quantity of the filling on the filling-carrier has been measured off and laid in the shed, operating through suitable instrumentalities said rod to put its finger in position to be struck by said bunter and actuate the transferrer, substantially as described.

5. In a loom the following instrumentalities, viz: a filling-carrier feeder, a transferrer, a lay having an attached bunter, a slide-rod having a finger which may be interposed between said bunter and transferrer, said rod being provided with an arm having a broad end, a filling-fork, its slide having a groove to receive the broad end of said arm in all positions of said slide-rod, stop-motion mechanism, and means between the filling-fork slide and said stop-motion mechanism to stop the loom in any position of the said slide-rod should the filling break, substantially as described.

6. In a loom the following instrumentalities, viz: a filling-fork, a slide-bar in which it is mounted, said bar having a groove at its end, a filling-carrier feeder, a transferrer, a lay having an attached bunter, a slide-rod having a finger which may be interposed between said bunter and transferrer, said rod being also provided with an arm having a broad end to enter the groove of the said bar, and remain therein in all positions of said slide-rod, a pattern-surface, means to actuate it, means intermediate said pattern-surface and its actuating means whereby when said slide-rod is rocked in any position in which it may be due to the breakage of the filling and the movement of the weft-fork slide, the pattern-surface will be stopped, substantially as described.

7. In a loom the following instrumentalities, viz: a filling-carrier feeder, a transferrer, a bunter, a series of shuttle-boxes having each a shuttle containing a removable filling-carrier, a plurality of measuring means, a finger, and devices between said measuring means and said finger and adapted to be moved by either of said measuring means after a given quantity of filling has been exhausted from a shuttle being moved in the loom, and put said finger in position to be moved by said bunter to operate the transferrer, substantially as described.

8. In a loom the following instrumentalities, viz: a shifting shuttle-box provided with a plurality of shuttles, a pattern-surface, means under the control of said pattern-surface to actuate said shuttle-boxes, a plurality of measuring devices, a series of pawls, one to operate each of said measuring devices according to which shuttle of the series is being operated, means to reciprocate said pawls to actuate said measuring devices, and means under the control of the shuttle-box-actuating devices to put one or the other of said pawls into position to strike and actuate one or the other of said actuating means, substantially as described.

9. In a loom, a plurality of measuring means presenting ratchet-wheels, a plurality of pawls one for each of said measuring means, shifting shuttle-boxes, and connections between said shuttle-boxes and said pawls to raise and put out of operation one or the other of the pawls, according to which shuttle-box is placed at the race of the lay, substantially as described.

10. Two measuring means, means to operate them independently, a pivoted arm provided with a finger and having a bearing, and a two-arm rock-shaft mounted in the bearing of said arm, combined with two legs one pivoted to each arm of said rock-shaft and coöperating with the measuring means to effect the movement of the said finger, substantially as described.

11. In a loom, the following instrumentalities, viz: a filling-feeder, a transferrer, the rock-shaft $b^{12}$ provided with an arm, a drop device free to be slid longitudinally with relation to said rock-shaft and provided with a lug and a latch, a slide-rod connected with the arm of the rock-shaft and provided with a projection which may be put into its abnormal position to effect the movement of a transferrer; a pivoted arm 210 having a bearing and provided with a finger, a two-arm rock-shaft mounted in the bearing of said arm, a leg pivoted to each arm of said shaft, two independently-actuated measuring means to control the position of said legs, means to actuate said measuring means, and a catch to turn said rock-shaft to let the drop device fall into its normal position after it has been locked by said finger, substantially as described.

12. In a loom, a filling-carrier feeder, a transferrer, a slide-rod having a finger which is adapted to be put into position to effect the operation of the transferrer, a rock-shaft having a drop device provided with a lug, means to actuate said drop device and put it into its abnormal position, combined with a sliding catch, and means to move it to engage the drop device, turn said shaft, and with it slide the said slide-rod, substantially as described.

13. In a loom, a measuring means composed of two ratchet-wheels having a differing number of teeth, and an opening, combined with friction-blocks, coöperating with each of said wheels, and means to actuate the said ratchet-wheels, substantially as described.

14. In a loom, a rock-shaft located at the breast-beam and provided with a finger pivoted on a horizontally-arranged stud, a lay provided with a bunter, and a transferrer, combined with means connected with said finger to interpose it at intervals between the bunter and the end of the transferrer to actuate the same, substantially as described.

In testimony whereof we have signed our names to this specification in the presence of two subscribing witnesses.

RANDOLPH CROMPTON.
HORACE WYMAN.

Witnesses:
JUSTIN A. WARE,
JOHN B. SYME.